US006873359B1

(12) United States Patent
Kozlowski et al.

(10) Patent No.: US 6,873,359 B1
(45) Date of Patent: Mar. 29, 2005

(54) SELF-ADJUSTING, ADAPTIVE, MINIMAL NOISE INPUT AMPLIFIER CIRCUIT

(75) Inventors: Lester J. Kozlowski, Simi Valley, CA (US); William E. Tennant, Thousand Oaks, CA (US); William A. Kleinhans, Thousand Oaks, CA (US)

(73) Assignee: Rockwell Science Center, LLC., Thousand Oaks, CA (US)

( * ) Notice: Subject to any disclaimer, the term of this patent is extended or adjusted under 35 U.S.C. 154(b) by 657 days.

(21) Appl. No.: 09/675,278

(22) Filed: Sep. 29, 2000

(51) Int. Cl.[7] .............................................. H04N 5/217
(52) U.S. Cl. ...................... 348/241; 250/208.1; 348/297
(58) Field of Search ................................ 348/294–297, 348/241, 308, 312, 314; 250/216, 208.1, 370.08, 338.1, 214 R (56) References Cited

U.S. PATENT DOCUMENTS

| | | |
|---|---|---|
| 4,249,122 A | 2/1981 | Widlar |
| 4,463,383 A | 7/1984 | Soneda et al. |
| 4,466,018 A | 8/1984 | Soneda et al. |
| 4,676,761 A | 6/1987 | Poujois |
| 4,794,247 A | 12/1988 | Stineman et al. |
| 5,043,820 A | 8/1991 | Wyles et al. |
| 5,055,667 A | 10/1991 | Sayag |
| 5,083,016 A | 1/1992 | Wyles et al. |
| 5,128,534 A | 7/1992 | Wyles et al. |
| 5,146,302 A | 9/1992 | Kumada |
| 5,296,696 A | 3/1994 | Uno |
| 5,345,266 A | 9/1994 | Denyer et al. |
| RE34,802 E | 11/1994 | Sayag et al. |
| 5,382,977 A | 1/1995 | Kozlowski et al. |
| RE34,908 E | 4/1995 | Wyles et al. |
| 5,471,515 A | 11/1995 | Fossum et al. |
| 5,541,402 A | 7/1996 | Ackland et al. |
| 5,576,763 A | 11/1996 | Ackland et al. |
| 5,587,596 A | 12/1996 | Chi et al. |
| 5,608,243 A | 3/1997 | Chi et al. |
| 5,627,112 A | 5/1997 | Tennant et al. |
| 5,665,959 A | 9/1997 | Fossum et al. |
| 5,929,434 A | 7/1999 | Kozlowski et al. |
| 5,933,190 A | 8/1999 | Dierickx et al. |
| 6,064,431 A | 5/2000 | Ueno |
| 6,147,340 A | * 11/2000 | Levy ...................... 250/214 R |
| 6,150,883 A | * 11/2000 | Ivanov ...................... 330/253 |
| 6,578,154 B1 | * 6/2003 | Wynen et al. ............... 713/500 |

OTHER PUBLICATIONS

R.H. Dyck and G.P. Weckler, "Integrated Arrays Of Silicon Photodetectors For Image Sensing", IEEE Trans. Electron Devices, ED–15, Apr. 1968, pp. 196–201.

J.D. Plummer and J.D. Meindl, "MOS Electronics For A portable Reading Aid For The Blind", IEEE J. Sold–State Circuits, SC–7, Apr. 1972, pp. 111–119.

(Continued)

*Primary Examiner*—Tuan Ho
*Assistant Examiner*—Yogesh Aggarwal
(74) *Attorney, Agent, or Firm*—Reed Smith, LLP (57) ABSTRACT

A self-adjusting adaptive input circuit with minimal excess noise and a linear charge-handling capacity exceeding $10^9$ electrons to enable high-quality imaging at long wavelength infrared backgrounds and video frame rates is disclosed. An integration capacitor stores a charge produced from a photodetector. A self-adjusting current source skims a current during integration on the integration capacitor. The gate voltage of a skimming transistor is set via a programming transistor in order to set the skim level.

23 Claims, 4 Drawing Sheets

OTHER PUBLICATIONS

N. Koikke, I. Takemoto, K. Satoh, S. Hanamura, S. Nagahara and M. Kubo, "MOS Area Sensor: Part 1—Design Consideration And Performance Of An n–p–n Structure 484×384 Element Color MOS Imager", IEEE Trans Electron Devices, ED–27 (8), Aug. 1980, pp. 1676–1681.

S. Ohba, M. Nakai, H. Ando, S. Hanamura, S. Shimada, K. Satoh, K. Takahashi, M. Kubo and T. Fujita, "MOS Area Sensor: Part II—Low–Noise MOS Area Sensor With Antiblooming Photodiodes", IEEE Trans. Electron Devices, ED–27 (8) Aug. 1980, pp. 1682–1687.

EG&G Reticon Sales Catalog, *Image Sensing and Solid State Camera Products 1994/1995*. Solid State Image Sensor Array Specification For Part No: RA0256B.

EG&G Reticon Sales Catalog, *Image Sensing and Solid State Camera Products 1994/1995. High–Speed*Solid State Image Sensor Array Specification For Part No.: RA2568N.

EG&G Reticon Sales Catalog, *Image Sensing and Solid State Camera Products 1994/1995*. Solid State Sensor Arrays Specification For Part Nos.: RA0100A/RA0128N.

H. Ando, S. Ohba, M. Nakai, T. Ozaki, M. Ozawa, K. Ikeda, T. Masuhara, T. Imaide, I. Takemoto, T. Suzuki and T. Fukita, Design Consideration And Performance Of A New MOS Imaging Device, IEEE Trans. On Elec. Dev., ED–32 (8), Aug. 1985, pp. 1484–1489.

N. Tanaka, T. Ohmi and Y. Nakamura, "A Novel Bipolar Imaging Device With Self–Noise Reduction Capability", IEEE Trans. Elec. Dev., 36(1), Jan. 1989, pp. 31–38.

G.P. Weckler, "Storage Mode Operation Of A Phototransistor And Its Adaptation To Integrated Arrays Foe Image Detection", IEDM, Oct. 1996. (Abstract Only—No known paper available from professional document delivery services).

N. Tanaka, T. Ohmi, Y. Nakamura and S. Matsumoto, "A Low–Noise Bi–CMOS Linear Imager Sensor With AutoFocusing Function", IEEE Trans. Elec. Dev., 36(1), Jan. 1989, pp. 39–45.

N. Tanaka, S. Hashimoto, M. Shinohara, S. Sugawa, m. Morishita, S. Matsumora, Y. Nakamura and T. Ohmi, A 310k Pixel Bipolar Imager (BASIS), ISSCC 1989.

G.P. Weckler, "Charge Storage Lights The Way For Solid–State Sensors", Electronics, May 1, 1967, pp. 75–78.

G.P. Weckler, "Operation of p–n Junction Photodetectors In A Photon Flux Integrating Mode", IEEE Journal Of solid State Circuits, vol. SC–2, No. 3, Sep. 1967, pp. 65–73.

G.P. Weckler and R.H. Dyck, "Integrated Arrays Of Silicon Photodetectors For Image Sensing", WESCON, Aug. 22–25, 1967, pp. 1–8.

L.J. Kozlowski, J. Luo, W.E. Kleinhans and T. Lui, "Comparison Of Passive And Active Pixel Schemes For CMOS Visible Imagers", SPIE, vol. 3360, Apr. 1998.

Ming–Jer Chin, Yen–Bin Gu, Terry Wu, Po–Chin Hsu and Tsung–Hann Liu, "Weak Inversion Charge Injection In Analog MOS Switches", IEEE Journal Of Solid–State Circuits, vol. 30, No. 5, May 1995, pp. 604–606.

Peter W. Fry, Peter J. W. Noble and Robert J. Rycroft, "Fixed–Pattern Noise In Photomatrices", IEEE Journal Of Solid–State Circuits, vol. SC–5, No. 5, Oct. 1970, pp. 250–254.

Degrauwe, et al., "A Microppower CMOS–Instrumentation Amplifier", IEEE Journal Of Solid–State Circuits, vol. SC–20, No. 3 Jun. 1985, pp. 805–807.

Letter Dated Jul. 31, 1998, From Gener Weckler, RAD–I-CON Imaging Corp., addressed to Mark Wettler.

Chamberlin, et al., "A Novel Wide Dynamic Range Silicon Photodetector And Linear Imaging Array", IEEE Transactions On Electron Devices, Vo. ED–31, No. 2, Feb. 1984, pp. 175–182.

L.J. Kozlowski, D. Standley, J. Luo. A Tomasini, A. Gallagher, R. Mann, B.C. Hsieh, T. Liu and W.E. Kleinhans, "Theoretical Basis And Experimental Confirmation: Why A CMOS Imager Is Superior To A CD", SPIE Conference On Infrared Technology And Applications XXV, Orlando, Fla, Apr. 1999, vol. 369, pp. 388–396.

* cited by examiner

SELF-ADJUSTING, ADAPTIVE, MINIMAL NOISE INPUT AMPLIFIER CIRCUIT

The present application is related to U.S. patent application Ser. No. 09/675,487, entitled "HIGH GAIN DETECTOR AMPLIFIER WITH ENHANCED DYNAMIC RANGE FOR SINGLE PHOTON READ-OUT OF PHOTODETECTORS", filed Sep. 29, 2000; and is also related to U.S. patent application Ser. No. 09/675,483, entitled "ADAPTIVE AMPLIFIER CIRCUIT WITH ENHANCED DYNAMIC RANGE", filed Sep. 29, 2000; the disclosures of which are herein incorporated by reference.

BACKGROUND OF THE INVENTION

1. Field of the Invention

The present invention relates generally to interface circuits for focal plane arrays (FPAs) and, specifically, to a self-adjusting adaptive amplifier circuit that uniquely provides high charge-handling capacity for optimally coupling IR detectors to multiplexing readouts in high-density staring FPAs.

2. Description of the Related Art

Optical sensors transform incident radiant signals in any spectral wavelength region, but most specifically in the near infrared (NIR; $\lambda$=0.8–2 $\mu$m), short wavelength IR (SWIR; $\lambda$=2.0–2.5 $\mu$m), medium wavelength IR (MWIR; $\lambda$=2.5–5 $\mu$m), and long wavelength IR (LWIR; $\lambda$=5–30 $\mu$m) bands into electrical signals that are used for data collection, processing, storage and display, such as real-time video. For high-quality imaging of various scenes without concern for ambient light, the MWIR and LWIR bands are often used interchangeably. However, MWIR infrared detector systems typically require sophisticated signal processing algorithms to accommodate the large dynamic changes in background information that result from the relatively high contrast and large solar influence of the scene radiation. Detectors operating in the preferred long wavelength infrared (LWIR) spectral band, on the other hand, can attain the same or greater thermal sensitivity with reduced signal processing complexity. This is especially true in the 8 to 12 $\mu$m wavelength atmospheric window, which is optimum for imaging many terrestrial scenes. As a result, infrared detection and tracking can be accomplished using smaller, more cost-effective sensors having LWIR focal plane arrays.

Unfortunately, the limited ability of the multiplexing readout circuits creates practical design constraints on LWIR focal plane arrays that in turn severely limit system performance. The result is degradation in signal-to-noise ratio by >10× below the theoretical limit. In the readout portion of a focal plane array, each pixel has a preamplifier to couple the signal from each detector into the respective unit cell. The corresponding readout site must perform several functions that are difficult to simultaneously incorporate in the small amount of "real estate" typically available on such a signal-processing chip. Ideally, each detector/amplifier cell of an FPA should include the following: 1) a detector interface stage that provides low impedance at a uniform operating bias; 2) an integration capacitor with large charge-handling capability; 3) a stage for uniform suppression of the background if integration capacity is inadequate; 4) facility for low-power multiplexing and reset; 5) an output buffer capable of driving the bus line capacitance for subsequent multiplexing of the electrical signal at video rates; and 6) a sufficiently large transimpedance to enable sensor-limited rather than camera-noise-limited performance; i.e., the output-referred noise level of the shot noise at the lowest background must be easily measurable by conventional camera electronics. Note that any focal plane array (not just an LWIR array, but for instance a high operating temperature MWIR array) whose operation generates large amounts of charge to be integrated in the input cell will suffer from these multiplexer limitations even beyond the natural limits of the detector inputs.

Staring LWIR FPAs in formats up to 1024 by 1024 have now been demonstrated in the prior art. However, these LWIR devices are typically coupled to conventional MWIR readout circuits, which have several deficiencies that compromise system performance. The limited charge-handling capacity, for example, supports camera sensitivity no better than that achieved by a typical MWIR FPA. This obviates a key benefit of operation in the LWIR spectral band. Moreover, prior art devices limit capability for reducing pixel pitch and increasing pixel density. If the pixel pitch and detector/amplifier cell real estate are reduced in prior art devices, the performance limitations are further exacerbated.

Given the current photolithographic state-of-the-art and the limited chip area, there is insufficient detector/amplifier cell real estate to integrate even the most important features including the ability to directly handle all the charge that can be generated during the full frame time. Nevertheless, because small cells are necessary for FPAs with high pixel counts that can be used with compact optics, the readout circuit must be integrated in as little chip real estate as possible. Thus, there is a need for a compact amplifier having characteristics that are better optimized for use in staring LWIR FPAs.

U.S. Pat. No. 5,128,534 teaches the technique of biasing a capacitor with a variable voltage source to increase the amount of charge that can be effectively integrated on an integrating capacitor (of the typical size that can readily fit into a standard unit cell). This improves the signal-to-noise ratio of the focal plane array by clipping excess signal. The enhancement in capacity is a trade-off for a nonlinear dynamic range; this non-linearity is not optimum for LWIR imaging since the signal of interest is a small fraction of the background radiation.

U.S. Pat. No. 5,055,667 and U.S. Pat. No. RE34,802 also disclose nonlinear techniques for visible CCD imagers. These methods control the dynamic range of a CCD in a manner somewhat analogous to U.S. Pat. No. 5,128,534 by providing a sink region to dispose of excess charge from the photogate region by clipping any signal above the potential set by a control gate where the potential can be similarly modulated during the exposure period. Such predetermined fluctuation can facilitate various transfer functions including logarithmic behavior. Such characteristics are not optimum for LWIR imaging.

U.S. Pat. No. 5,382,977 proposes an alternative that effectively enhances the linear charge-handling capacity via electronic scanning. Since the total charges accumulated during a typical frame time ($\frac{1}{60}^{th}$ second) can exceed $10^{10}$ carriers while the typical integration capacitor can only handle on the order of mid-$10^7$ carriers, this method accepts the ~100× disparity between the two to extend the linear capacity to approximately $10^9$ carriers. Unfortunately, all the available charges for each frame time are not used so maximum sensitivity is impossible. The inefficiency translates to a proportional reduction in the effective quantum efficiency of the imaging sensor.

U.S. Pat. No. 5,146,302 again teaches skimming in a CCD to enhance the linear charge-handling capacity. To improve efficacy, a sampling circuit comprising a tandem input is used to generate a prescribed skimming voltage. However, the non-uniformity in threshold voltages between the input gates of the main input and the sampling input sets a limit on the amount of charge that can be skimmed. This limit is typically no more than 3 times the instantaneous charge-handling capacity. The linear capacity is thus effectively increased to the order of $10^8$ carriers. A further improvement of two orders of magnitude is still needed.

Figure 1:
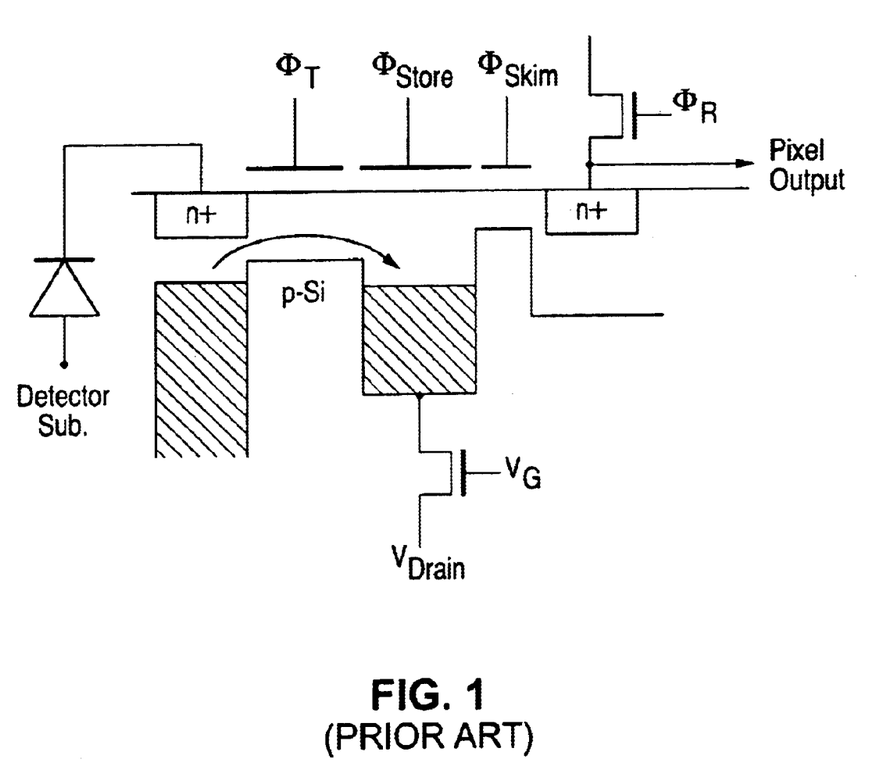
FIG. 1 is a schematic diagram of a prior art technique for enhancing dynamic range as shown in U.S. Pat. No. 6,064,431.

Finally, U.S. Pat. No. 6,064,431 discloses a circuit for skimming to linearly enhance the effective charge-handling capacity. This circuit, shown in FIG. 1, provides automatic control of the skimming charges to be transferred. Here the capability for predetermined sinking of excess signal, as taught by U.S. patent '534, '667 and '802 noted above, is combined with conventional skimming, as taught by the '302 patent, to further enhance the effective charge-handling capacity. In principle, the 2× to 3× enhancement of '302 patent can be enhanced to yield several orders of magnitude enhancement in charge-handling capacity. Unfortunately, the improvement is again non-linear and thus not optimum for infrared applications.

SUMMARY OF THE INVENTION

In general, the present invention provides a self-adjusting adaptive input circuit with minimal excess noise and a linear charge-handling capacity exceeding $10^9$ electrons to enable high-quality imaging at long wavelength infrared backgrounds and video frame rates. The invention supports various types of photovoltaic and photoconductive detectors, and largely reduces the fixed pattern noise relative to the prior art. The self-adjusting adaptive minimal noise input (SAAMI) amplifier circuit comprises either impedance-buffered or direct injection detector interface with self-nulling skimming of the background signal and self-adapting offset suppression. An integration capacitor stores a charge produced from a photodetector. A self-adjusting current source skims a portion of this charge so that the integration capacitor stores only the difference between the charge generated and the charge skimmed. The gate voltage of a skimming transistor is set via a programming transistor in order to set the skim level of the current source.

The net result is LWIR FPA sensitivity commensurate with a charge-handling capacity of $10^9$ carriers and about 8 bits of dynamic range. In the LWIR context, the noise equivalent temperature difference that can be achieved is of the order of 0.003K, which is an order of magnitude better than is typically achieved. The front-end provides very uniform skimming at a minor cost in shot noise and a relative reduction in read noise.

The present solution can be integrated into the small pixel sizes normally used to amplify the infrared signal for subsequent processing or display. The resulting video has large margin over the background noise of the camera electronics.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The following description is provided to enable any person skilled in the art to make and use the invention and sets forth the best modes contemplated by the inventor for carrying out the invention. Various modifications, however, will remain readily apparent to those skilled in the art, since the basic principles of the present invention have been defined herein specifically to provide to a self-adjusting adaptive amplifier circuit that uniquely provides high charge-handling capacity for optimally coupling IR (or other high-current generating) detectors to multiplexing readouts in high-density staring FPAs. Any and all such modifications, equivalents and alternatives are intended to fall within the spirit and scope of the present invention.

The present invention provides a high-performance detector amplifier to optimally read out the signal from each pixel of an infrared focal plane array. According to the various embodiments of the present invention, one benefit is the simultaneous achievement of high sensitivity with video dynamic range of about 8 bits. A second benefit is an output signal that is rich with signal content rather than parasitic non-uniformities. The usable dynamic range of most high-performance thermal imagers is limited by the fixed pattern noise stemming from offset variations generated by the detector and amplifier. A third benefit is the flexibility to independently reprogram each pixel in order to pursue alternative algorithms for non-uniformity compensation, such as scene-based techniques for detecting fast-moving objects.

Figure 2:
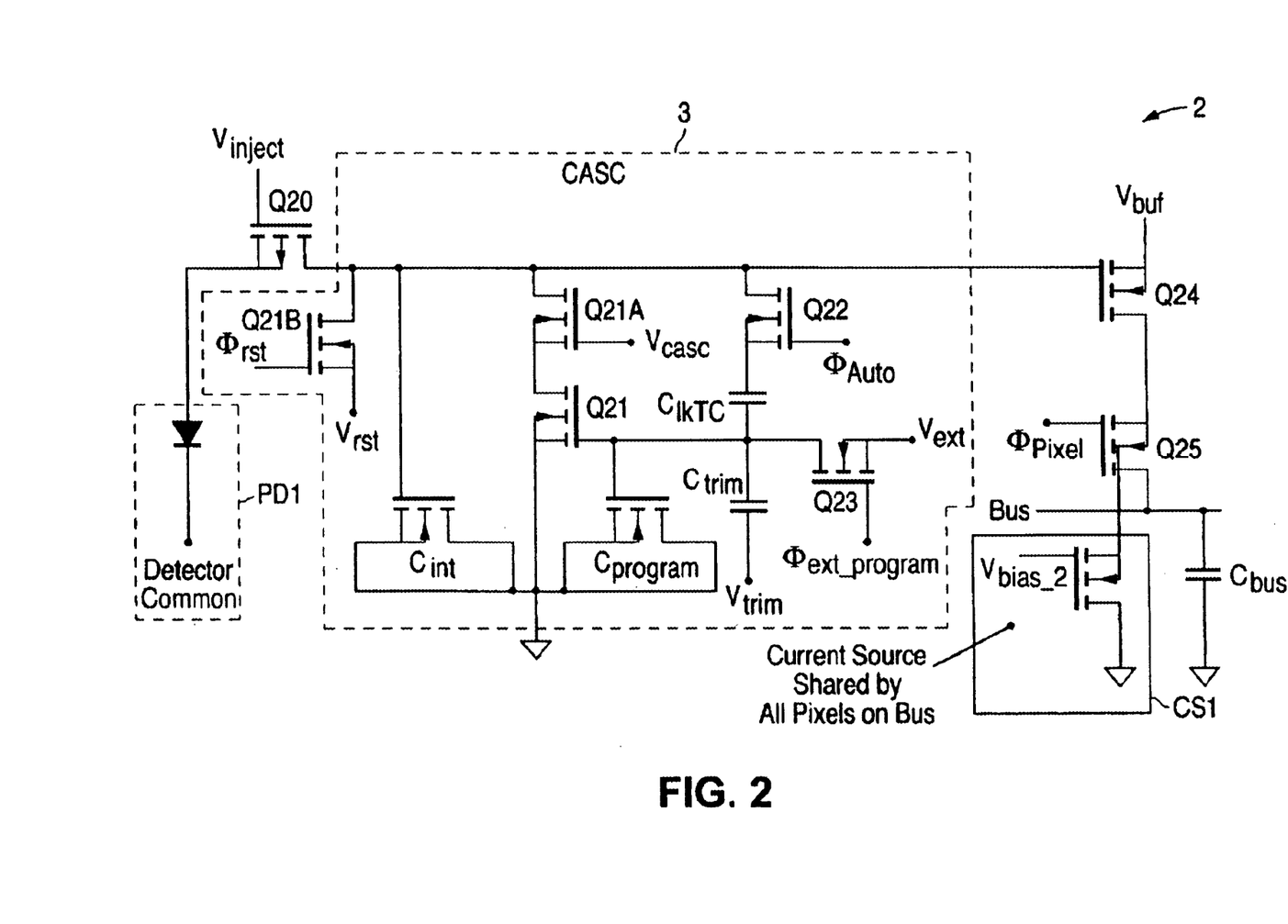
FIG. 2 is a schematic diagram of a first embodiment of a self-adjusting adaptive amplifier with minimal noise input according to the present invention.

A first embodiment of the present invention is shown in FIG. 2. The amplifier circuit 2 comprises a detector PD1 that is directly coupled to the source of an input transistor Q20. The gate of Q20 is adjusted to set the detector bias and the source of Q20 is modulated by the photo-generated signal from PD1. Minority carriers are injected into an integration capacitor $C_{int}$ where they are accumulated for subsequent readout. This integration capacitor can be reset by a transistor Q21B to an initial voltage $V_{store}$ that may even be a large external voltage as taught by U.S. Pat. No. 6,064,431, noted above, or it may be generated on chip. Alternately, other variants can have the integration capacitor tied to a common level or ground.

To enhance the effective integration capacity, the integration capacitor $C_{int}$ is connected to a self-adjusting current source comprising transistor Q21 (preferably cascoded with transistor Q21A to prevent undesirable parasitic coupling from $C_{int}$ to the gate of Q21), a programming capacitor $C_{program}$, a programming transistor Q22 (preferably coupled through a small kTC-noise-lowering capacitor $C_{lkTc}$), and a trim capacitor $C_{trim}$. The self-nulling current source provided by transistor Q21 and Q21A produces a current sink that drains or "skims" a set level of current from the current being integrated on $C_{int}$. The gate voltage of Q21 is programmed by applying an enabling $\Phi_{auto}$ pulse to the gate of Q22 to create a replicating current in Q21. As the current from Q20 accumulates charge on $C_{int}$, the voltage on $C_{program}$ and $C_{trim}$ (being fractionally coupled to the $C_{int}$ voltage by $C_{lkTC}$) increases, raising the current through Q21, and reducing the rate at which the charge accumulates on $C_{int}$. The gate voltage rises until the current through Q21 equals the current entering through Q20, causing the charge build-up on $C_{int}$, $C_{program}$, and $C_{trim}$ to cease.

To establish this near optimal bias condition on the gate of Q21, the programming gate voltage is self-adjusted by closing the programming switch. Closing this switch places kTC noise on the effective capacitance of the series of $C_{lkTC}$ and $C_{program}+C_{trim}$, but the fraction of this noise that actually resides on the gate of Q21 is reduced by the ratio $[C_{lkTC}/(C_{program}+C_{trim})]^{1/2}$ from what it would be in the absence of $C_{lkTc}$. Also, the feedback of Q21 minimizes kTC noise on its gate as it is turned on.

Fine-tuning of the voltage stored on each programming gate is provided by applying a trimming signal, $V_{trim}$, to the $C_{trim}$ capacitor. $V_{trim}$ is adjusted to produce a slight residual current for integration on $C_{int}$. The capacitive divider formed by the ratio of $C_{trim}$ to $C_{program}$ optimally reduces the sensitivity to $V_{trim}$ and allows small changes to be made to the programming value using relatively large voltages.

The voltage on each $C_{program}$ of the FPA can also be externally set via Q23 by applying a voltage at $V_{ext}$. The process of programming the entire FPA results in the application of a waveform to either $V_{trim}$ or $V_{ext}$ via, for example, a DAC with 4 to 12 bit resolution, depending on the desired voltage range. Note that selecting on a pixel-by-pixel basis whether or not to re-set the node to an external voltage, provides another approach to reducing the effects of kTC noise in the external programming mode. In this case, only those nodes are re-set which have outputs that, due to kTC noise, fall outsisde an acceptably uniform range. Clearly this process is cumbersome, but for some applications it can provide an extra degree of uniformity in the external programming mode.

For ease of reference, we define the Core Adaptive Skimming Circuit (CASC) 3 as the portion of the circuit 2 in FIG. 2 consisting of $C_{int}$, $C_{program}$, $C_{trim}$, $C_{lkTC}$, Q21, Q21A, Q21B, Q22 and Q23 along with all bias leads, ground leads and interconnects, as indicated by the dashed region in the figure. The CASC 3 may be adpated to many circuit variants, such as those described in the related cases noted above.

A source follower transistor Q24 may be used to buffer the signal and an access transistor Q25 supplies the signal to the bus. This allows integration of small amounts of charge to be transmitted off chip without the gain reduction caused by the sharing of charge between the integration capacitor and the bus. Also, a common current source CS 1 may be connected to the bus and shared by all the pixels on the bus.

Once the skimming level is set, the value can be used for many frames to subtract the prescribed amount of charge. On the other hand, the circuit can be used for frame-to-frame subtraction by resetting the circuit at the beginning of each frame.

Each FPA is comprised of an array of such pixels. The maximum FPA output voltage swing will be limited by the range of charges integrated in the various pixels. The maximum total swing can be directly expressed as:

$$V_{MAXOUT} = 5 \frac{\Delta Q_{int}}{C_{int}}$$

where $5\Delta Q_{int}$ is the total range (for 99% of the pixels) of residual integrated charge after skimming. Further, $$\Delta Q_{int} = t_{int} \Delta \{I(1 - e^{\frac{-V_{skim}}{V_T}})\}$$

where $t_{int}$ is the integration time, I is the photodiode current, $V_{skim}$ is the gate voltage on the skimming FET Q21 (above threshold), $V_T$ is the thermal voltage and $\Delta$ represents variation. The variation in the net integrated current simplifies to:

$$\Delta\{I(1 - e^{\frac{-V_{skim}}{V_T}})\} = \{\Delta I(1 - e^{\frac{-V_{skim}}{V_T}})^2 + (I\frac{\Delta V_{skim}}{V_T})^2\}^{1/2}$$

$$= \{\Delta I(\frac{V_{skim}}{V_T})^2 + (I\frac{\Delta V_{skim}}{V_T})^2\}^{1/2}$$

because the first term that would otherwise appear in braces is eliminated by the adaptive circuit. The variation in the skim voltage in the preceding expression is:

$$\Delta V_{skim} = \left[\frac{kTC_{lkTC}}{(C_{program}+C_{trim})^2} + 2q\frac{It_{skim,int}C_{lkTC}^2}{C_{skim,int}^2(C_{program}+C_{trim})^2}\right]^{1/2}$$

The first term in the braces is the programming error due to kTC noise and may be further reduced by a feedback-enhanced technique known as tapered reset, as disclosed in U.S. Pat. No. 6,697,111 entitled "COMPACT LOW-NOISE ACTIVE PIXEL SENSOR WITH PROGRESSIVE ROW REST" filed Apr. 8, 1998, the disclosure of which is herein incorporated by reference. The second term is shot noise due to the charging currents in the reset procedure. The term $t_{skim,int}$ is the time used to integrate the charge to establish the skim voltage on the skim transistor. The term $C_{skim,int}$ is the amalgamated capacitor on which this charge is integrated and on which the skim voltage is established prior to isolating the skim FET. It is clear that it helps to make $C_{skim,int}$ as large as possible to achieve the smallest error in the programming voltage, $V_{skim}$. However, the kTC isolation capacitor $C_{lkTC}$ also reduces this noise substantially. Proper setting of the intialo voltage conditions can allow $It_{skim,int}$ to approach the maximum integrable charge on $C_{int}$. If we assume this is $10^7$ charges and we wish to integrate $10^9$ charges (99%), we need to be sure that $\Delta V_{skim}$ is less than 0.2% of the thermal voltage, or about 14 $\mu$V at 80K. We can illustrate the significance of these terms by assuming reasonable capacitance values for a small (~313 $\mu m^2$) unit cell. Taking $C_{int}$=750 fF, $C_{program}$100 fF and $C_{trim}$ and $C_{lkTc}$ both=10 fF, the right hand term would give 87 $\mu$V—a bit large for the target skim fraction. The left hand term would give 30 $\mu$V. Optimizing the cell (within current design rules) by sizing $C_{progam}+C_{trim}=C_{int}$ and making $C_{lkTC}$ as small as possible in current design rules we would have $C_{int}$=430 fF and $C_{lkTC}$=5 fF with the result that the kTC noise is only 5.5 $\mu$V and the shot noise is 19.3 $\mu$V, very near the desired target.

Figure 3:
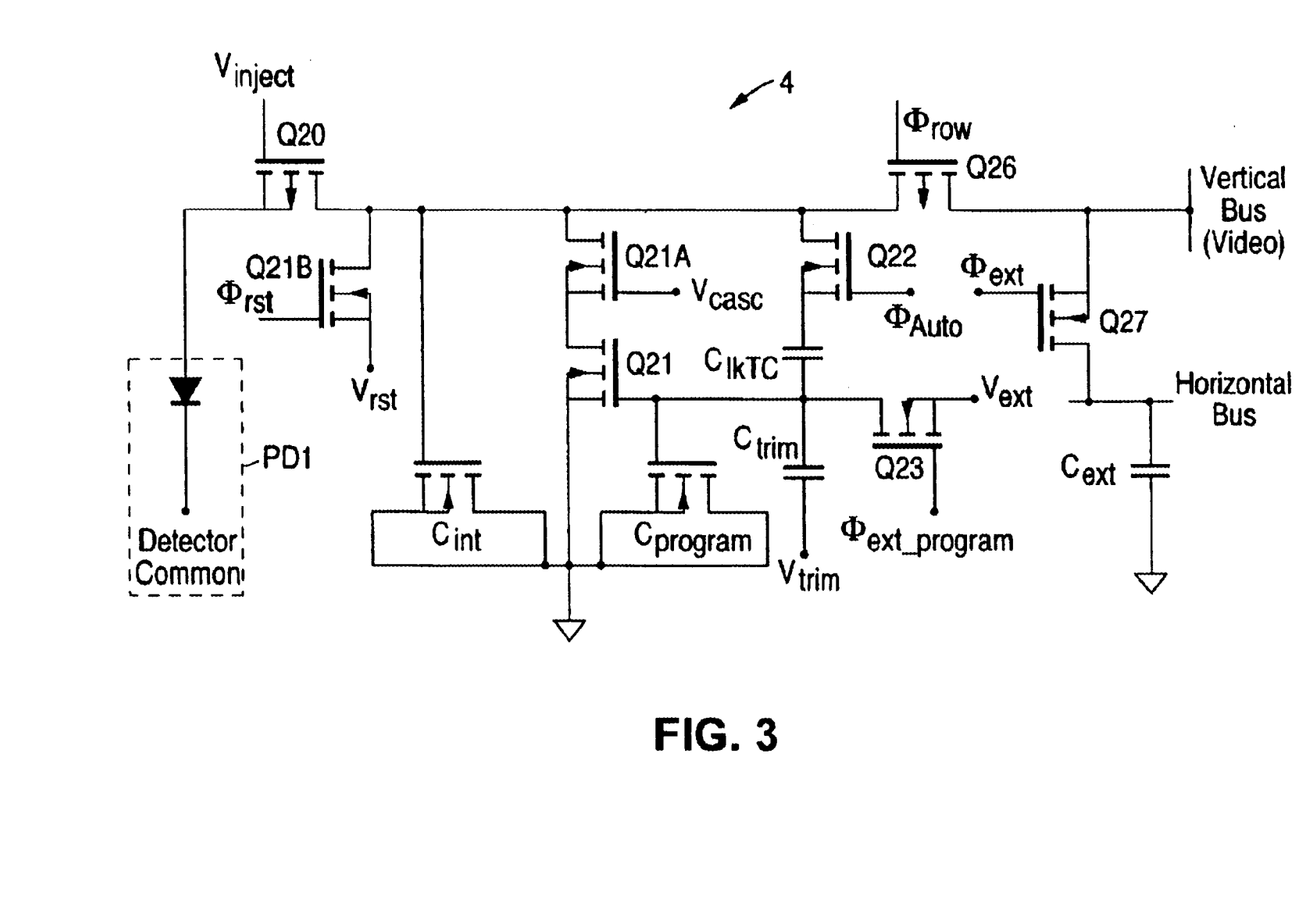
FIG. 3 is a schematic diagram of an embodiment of a self-adjusting adaptive amplifier with minimal noise input and impedance-buffered interface to the photodetector.

Since $C_{skim,int}$ is the parallel combination of all the capacitances, it can be readily increased outside of the pixel by adding capacitance, $C_{ext}$, to boost the basic value from $C_{skim,int}=C_{int}+(C_{lkTC}^{-1}+(C_{program}+C_{trim})^{-1})^{-1}$. The embodiment of the present invention shown in FIG. 3 allows $C_{ext}$ to be added through a vertical (or column) bus. This capacitance, $C_{ext}$, is limited only by practical considerations. A $C_{ext}$ of only approximately 1 pF is needed to allow 99% skim on 99% of the pixels to boost the effective charge handling capacity by 100 times. This large $C_{skim,int}$ value somewhat slows the resetting procedure, but reduces the shot noise error on the reset in rough proportion to the square root of the slowing. The source follower (Q24 FIG. 1) at the output of the amplifier 4 has been removed in a simplified illustration to better show the addition of the external capacitor $C_{ext}$, but it can be inserted as before as long as there is a switch to connect the output line of Q20 to the large external capacitor during charging. Such an optional change is familiar to those skilled in the art, and is often made depending on the size of the array and the concomitant charge-sharing that can occur between $C_{int}$, the capacitance of the signal capacitance and the required video swing.

Since the best programming accuracy is achieved by using the largest possible $C_{program}$, this capacitor is best provided by using a MOS capacitor in the substrate. Minimizing the drift of the programming voltage stored on such a capacitor requires that the capacitor by electrically and optically shielded from the switching transistors in the pixel. As a transistor is switched, a fraction of the hot carriers in the channel luminesce. Such photoluminescence injects light into the oxide and the silicon substrate. The upward light must be blocked by the overlying metal layers when the pixel is layed out. The light injected into the substrate must be blocked by surrounding n-well regions that are reverse-biased to deep depletion to collect the stray light. Otherwise, the programming capacitor will discharge and cause the skimming current to gradually drift from the optimum value.

Figure 4:
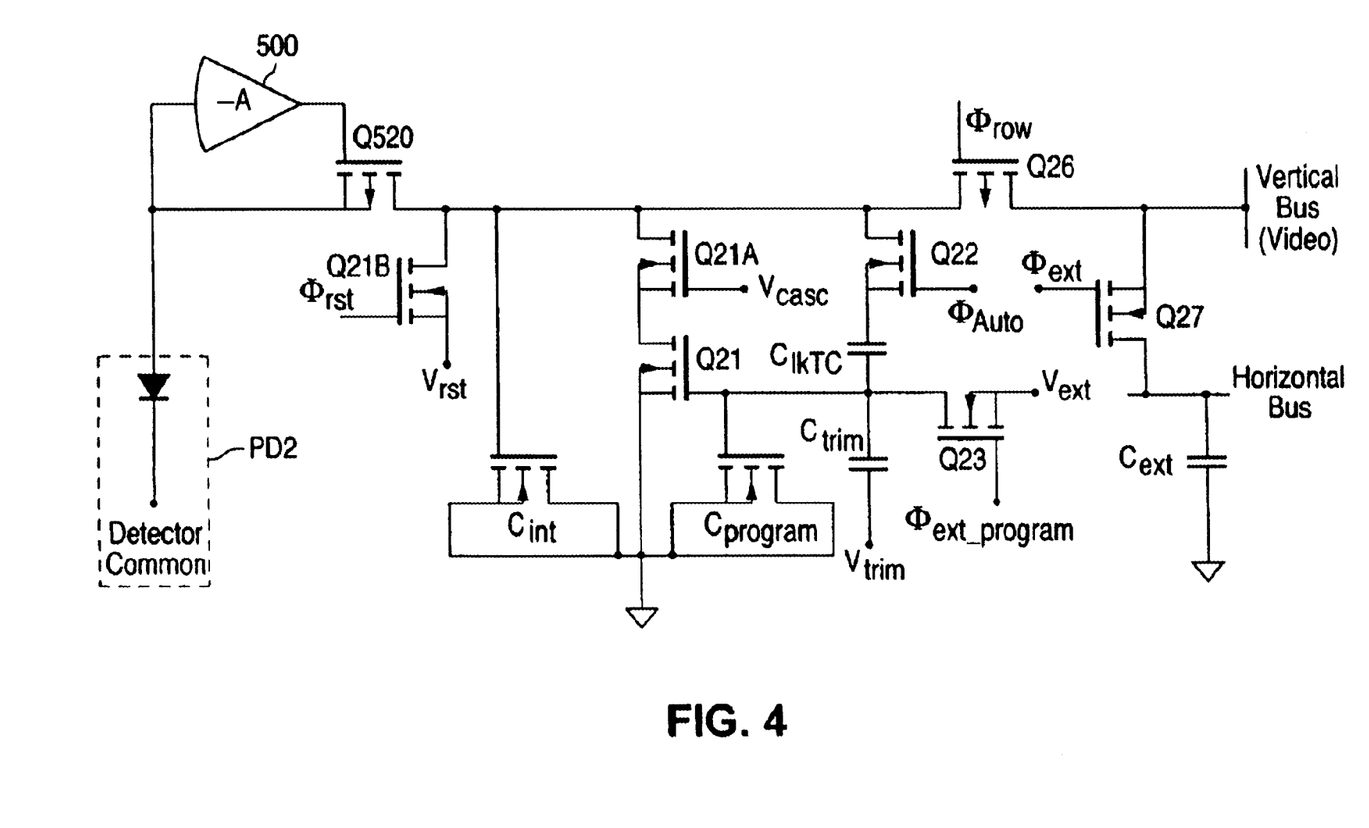
FIG. 4 is a schematic diagram of an alternative embodiment of the self-adjusting adaptive amplifier with minimal noise input and high accuracy for programming the skimming current.

The key aspects of the present self-adjusting adaptive input with minimal noise circuit are applicable to other types of circuits used for interfacing infrared detectors. For example, FIG. 4 is a schematic circuit of an alternative embodiment for use with lower impedance detectors PD2, such as those fabricated in the HgCdTe ternary system for operation at cutoff wavelengths beyond 12 $\mu$m at operating temperatures above 60K. The negative feedback provided by amplifier 500 enhances the injection efficiency of detector current into the integration capacitor by decreasing the input impedance of source-modulated transistor Q520. The inverting amplifier can be of many types known to those of ordinary skill in the art, such as a basic CMOS inverter, a basic differential amplifier, or a folded cascode differential amplifier, among others. Regardless, the amplifier will also luminesce and must be optically shielded from the programming capacitor for proper operation of the skimming adjunct.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A photodetector amplifier circuit comprising:
   a photodetector;
   an input transistor connected to the photodetector;
   an integration capacitor connected to an output of the input transistor; and
   an adaptive skimming circuit connected to the integration capacitor, the adaptive skimming circuit comprising:
   a current source transistor;
   a programming capacitor connected to the current source transistor;
   a programming transistor connected to the current source transistor and the programming capacitor;
   a cascode transistor connected to the current source transistor and the input transistor;
   a reset transistor connected to the input transistor; and
   a kTC-noise reducing capacitor connected between the programming transistor and the programming capacitor.

2. The circuit of claim 1, wherein the adaptive skimming circuit further comprises a trim capacitor connected to the current source transistor, the programming capacitor, and the programming transistor.

3. The circuit of claim 2, further comprising an external voltage transistor connected to the programming transistor.

4. The circuit of claim 3, further comprising a source follower transistor connected to the output of the input transistor.

5. The circuit of claim 3, further comprising an access transistor connected between the input transistor and a bus.

6. The circuit of claim 5, further comprising an external capacitor connected to the bus.

7. The circuit of claim 2, further comprising a negative feedback amplifier connected between the photodetector and the input transistor, wherein the photodetector is a low impedance detector.

8. A pixel cell comprising:
   an input transistor;
   a photodetector coupled to the source of the input transistor;
   an integration capacitor for storing a charge proportional to an amount of incident light on the photodetector; and
   an adaptive skimming circuit formed in the pixel cell and connected only to the pixel cell comprising:
   a current source transistor connected across the integration capacitor;
   a cascode transistor connected to the current source transistor and the input transistor;
   a reset transistor connected to the input transistor;
   a programming capacitor connected to the current source transistor; and
   a programming transistor connected to the current source transistor;
   wherein a current source provided by the current source transistor sinks a set level of current during integration of a charge on the integration capacitor, such that a photodetector current is optimized at each pixel.

9. The pixel cell of claim 8, wherein the adaptive skimming circuit further comprises a trim capacitor.

10. The pixel cell of claim 9, wherein the adaptive skimming circuit further comprises a kTC-noise reducing capacitor connected between the programming transistor and the programming capacitor.

11. The pixel cell of claim 10, further comprising an external voltage transistor connected to the programming transistor.

12. The pixel cell of claim 11, further comprising a source follower transistor connected to the output of the input transistor.

13. The pixel cell of claim 11, further comprising an access transistor connected between the input transistor and a bus.

14. The pixel cell of claim 13, further comprising an external capacitor connected to the bus.

15. The pixel cell of claim 11, further comprising a negative feedback amplifier connected between the photodetector and the input transistor, wherein the photodetector is a low impedance detector.

16. A focal plane array (FPA) having a plurality of pixel cells, each pixel cell comprising:
   an input transistor;

a photodetector coupled to the source of the input transistor;

an integration capacitor for storing a charge proportional to an amount of incident light on the photodetector; and an adaptive skimming circuit comprising:

a current source transistor connected across the integration capacitor;

a cascode transistor connected to the current source transistor and the input transistor;

a reset transistor connected to the input transistor;

a programming capacitor connected to the current source transistor;

a programming transistor connected to the current source transistor;

a trim capacitor connected to the programming transistor; and a kTC-noise reducing capacitor connected between the programming transistor and the programming capacitor;

wherein a current source provided by the current source transistor skims off current during integration on the integration capacitor.

17. A method for skimming current in an amplifier circuit, the method comprising:

generating a signal proportional to an amount of light incident on a photodetector;

producing a sink current; and reading out a signal that is proportional to the difference between the generated signal and the sink current;

wherein producing a sink current comprises:

setting a gate voltage of a skimming transistor by applying an enabling pulse to a programming transistor that produces a replicating current in the skimming transistor; and applying a trimming voltage to a trimming capacitor.

18. The method of claim 17, wherein further comprising storing the generated current into a capacitor, and reading out the signal from the capacitor, such that the sink current sinks a set level of a signal read out from the capacitor.

19. An amplifier circuit for coupling infrared (IR) detectors to multiplexing readouts, the circuit comprising:

an input transistor;

a detector coupled to a source of the input transistor;

a current source transistor having a drain connected to a drain of the input transistor;

an integration capacitor connected between the drain and a source of the current source transistor;

a programming capacitor connected between a gate and the source of the current source transistor;

a programming transistor having a drain connected to the drain of the current source transistor, and a source connected to the source of the current source transistor;

a trim capacitor connected to the source of the programming transistor and the gate of the current source transistor;

a kTC-noise reducing capacitor connected between the source of the programming transistor and the gate of the current source transistor.

20. The circuit of claim 19, further comprising:

a reset transistor having a drain connected to the drain of the input transistor; and a cascode transistor having a drain connected to the drain of the input transistor, and a source connected to a drain of the current source transistor.

21. The circuit of claim 20, further comprising an external voltage transistor having a drain connected to the source of the programming transistor, and a source connected to an external voltage.

22. The circuit of claim 21, further comprising a source follower transistor having a source connected to the drain of the input transistor.

23. The circuit of claim 22, wherein the integration capacitor and the programming capacitor are formed from MOSFETs.

* * * * *